(12) United States Patent
Lampis

(10) Patent No.: US 6,181,110 B1
(45) Date of Patent: Jan. 30, 2001

(54) HIGH-YIELD LINEAR GENERATOR SET, CONTROL METHOD AND TRACTION UNIT THEREWITH

(76) Inventor: Rinaldo Lampis, Via Monte Basso, 1, 24019 Zogno Bergamo (IT)

( * ) Notice: Under 35 U.S.C. 154(b), the term of this patent shall be extended for 0 days.

(21) Appl. No.: 09/230,639

(22) PCT Filed: Jul. 25, 1997

(86) PCT No.: PCT/EP97/04160

§ 371 Date: Jan. 25, 1999

§ 102(e) Date: Jan. 25, 1999

(87) PCT Pub. No.: WO98/04819

PCT Pub. Date: Feb. 5, 1998

(30) Foreign Application Priority Data

Jul. 30, 1996 (IT) .............................................. MI96A1634

(51) Int. Cl.[7] .................................................. H02K 33/00
(52) U.S. Cl. .................. 322/3; 290/40 R; 310/12
(58) Field of Search ..................................... 290/1 R, 1 A, 290/4 R, 4 A, 40 R; 322/3, 46; 310/12

(56) References Cited

U.S. PATENT DOCUMENTS

| | | | | |
|---|---|---|---|---|
| 3,766,399 | * | 10/1973 | Demetrescu | 290/40 |
| 3,895,236 | * | 7/1975 | Herron | 290/55 |
| 4,511,805 | * | 4/1985 | Boy-Marcotte et al. | 290/2 |
| 4,532,431 | * | 7/1985 | Iliev et al. | 290/4 R |
| 4,594,521 | * | 6/1986 | Schlicher | 310/15 |
| 5,172,784 | * | 12/1992 | Varela, Jr. | 180/65.4 |
| 5,397,922 | * | 3/1995 | Paul et al. | 290/1 A |
| 5,788,003 | * | 8/1998 | Spiers | 180/65.2 |

* cited by examiner

Primary Examiner—Nicholas Ponomarenko
(74) Attorney, Agent, or Firm—Shlesinger, Fitzsimmons & Shlesinger

(57) ABSTRACT

The operation of a linear electric generator which includes a slide reciprocated by a pair of axially aligned internal combustion pistons, is improved by employing a control device that responds to a slide speed signal produced during each stroke of the slide. During at least one central area of each slide stroke the device controls current from the generator to produce a force that resists the slide motion and that is substantially proportional to the slide speed.

10 Claims, 1 Drawing Sheet

HIGH-YIELD LINEAR GENERATOR SET, CONTROL METHOD AND TRACTION UNIT THEREWITH

BACKGROUND OF THE INVENTION

The present invention relates to a generator set consisting of a linear electric generator integrated with an internal combustion engine, a control method and a traction unit accomplished with it.

Known in the art are generator sets formed of an electric rotary generator driven by a normal internal combustion engine interconnected therewith. Bulkiness, weight and complexity of these sets is well known.

"Linear" generator sets have been proposed, which comprise an internal combustion engine made of two opposite piston-cylinder sets fixedly connected in phase opposition, between which a slide forming a linear-movement electric generator is disposed.

However, in the known art, either a movement of the slide at will or a movement having a sinusoidal speed profile has always been proposed. In the first case, each piston is very likely to hit the head of its own cylinder (or the safety end-of-stroke elements, if any) in case of failure in ignition or out-of-phase ignitions. In the second case, a sinusoidal course is conceived for the purpose of simulating the equivalent of a flywheel that in a normal internal combustion engine controls the piston acceleration and deceleration strokes. The flywheel effect is simulated by controlling the electric energy absorbed by the electric generator behaving like a generator, motor or electric brake depending on the current direction between the generator and the user or the storage means of the produced electric energy.

For example GB-A-2,219,671 discloses a linear generator in which a sinusoidal motion is imposed to the movable portion.

EP-A-0 120 986 describes a linear generator in which control of the generator movement is made for simulating a mass-free flywheel, by periodically feeding the generator like a motor.

As a result of experiments carried out by the herein applicant, the idea of an electric flywheel storing and giving back energy into and from the slide in order to cause a sinusoidal motion of same cannot be proposed due to the great amount of the exchanged energy with respect to the useful one. The Applicant has found that by a sinusoidal motion the electric generator would have to transfer great amounts of energy from and to the slide, in the form of kinetic energy, against a very reduced amount thereof drawn during a whole cycle. Under these conditions, a yield of the electric generator which is even slightly lower than the unit greatly impairs the overall yield, making it even null. It has therefore appeared that in this type of control it is impossible to leave out of consideration the energy extraction/admission yield in the mechanical system, which yield is typically in the order of 80–90% and invalidates any system taking into account the possibility of taking up and introducing kinetic energy from and into the mechanical system.

The basic error contained in wishing to impose a sinusoidal motion or leaving a free motion to the slide has hitherto prevented accomplishment of "linear" generator sets having such satisfactory performance that they could be used in a practical way.

It is a general object of the present invention to obviate the above mentioned drawbacks by providing a linear generator set having such a yield and operating safety that it can really be advantageously used for replacing traditional generator sets with a rotary internal combustion engine and electric generator. It is also provided an electric traction unit comprising this electric generator.

SUMMARY OF THE INVENTION

In view of the above object, in accordance with the invention, a method of controlling the movement of a linear electric generator has been devised, which generator is moved by a pair of internal combustion pistons disposed axially aligned and in opposition to each other, in which current absorption is controlled in such a manner that, during a reciprocating motion cycle of the generator, a resisting force acting on the generator is obtained which is substantially proportional to the movement speed of the generator at least at a central stroke area, In accordance with this method, a linear electric generator set has been conceived which comprises a slide moved by a pair of internal combustion pistons disposed axially aligned and in opposition to each other, characterized in that it comprises a control device receiving a speed signal of the slide along its stroke and in that, at least at a central stroke area, it absorbs a current substantially proportional to this speed from the generator to produce a force resisting to the slide motion which is substantially directly proportional to this speed.

Finally, accomplishment of a traction unit has been also conceived which comprises a generator set as above described supplying at least one electric motor, characterized in that it comprises a drive circuit which on reception of a braking signal of the motor, absorbs current from the motor and sends it to an air pumping compressor in a container supplying compressed air to a supercharging circuit of the piston chambers.

For better explaining the innovatory principles of the present invention and the advantages it offers over the known art, a possible embodiment of the invention applying said principles will be given hereinafter, with the aid of the accompanying drawings. In the drawings:

THE DRAWINGS

PREFERRED EMBODIMENTS OF THE INVENTION

Figure 1:
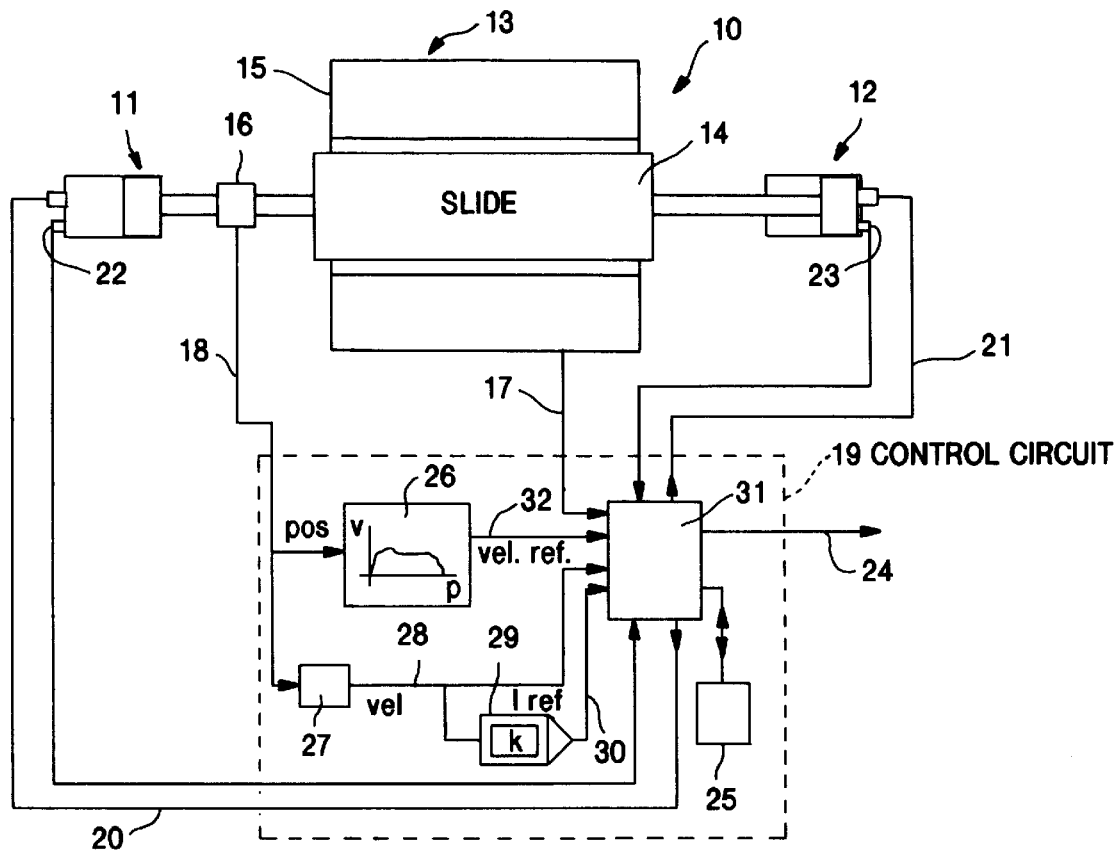
FIG. 1 represents a diagrammatic view of an electric generator set made in accordance with the invention.

With reference to the drawings, the generator set, generally identified by reference numeral 10, comprises a pair of opposite pistons 11 and 12 moving a linear electric generator 13 having an output 17. The generator is formed of an indicator slide 14, integral with the pistons, and a stator 15. Advantageoulsy the slide 14 carries permanent magnets for generating a magnetic field and the stator comprises electric windings cutting this field during the slide motion.

The slide position in its stroke is detected by a position sensor 16. The sensor also enables the slide speed during motion to be known, by appropriate signal processing. The position signal 18 and output 17 are sent to an electronic control device 19, made following a technique known per se, of the wired or programmed logic for example, for application of the control method to be subsequently described. The control device makes externally available the electric power generated by the generator set, at a socket 24.

If required by the type of internal combustion engine adopted, the control device emits commands 20, 21 for detonation triggering in the piston chambers. Advantageously, for reasons to be clarified in the following, according to a principle of the invention, known pressure sensors 22, 23 may be also present and they detect pressure within the piston chambers and communicate value of same to the control device 19.

It is apparent that in a motor as above described it is important to define a law for the slide motion control, which motion is not previously defined by the mechanical structure, which on the contrary happens in rotary internal combustion engines, In the technical art relating to linear generators it has been at most always proposed a sinusoidal motion for likeness to rotary motors. As already said, the same applicant has however noticed that this solution is highly unsatisfactory.

For reaching the present invention therefore, the Applicant has started from a point opposite to the traditional one and has found it advantageous to carry out a control that continuously draws energy from the moving slide, without taking into account the problem of the resultant motion of the slide, but aiming at control on the final position of the slide and maximization of the drawn energy per cycle. This enables an appropriate compression of the inflammable fluid and a regular combustion.

The first aim relating to control, i.e. reaching the final position at a speed almost corresponding to zero, can be achieved by imposing drawing, during the stroke, of the whole available kinetic energy. The second result (maximization of the drawn energy per cycle) could be obtained in different ways. Supposing the energy amount Ec to be drawn known, it is possible:

a) drawing energy at a constant rate during motion, that is by applying a resisting force which is inversely proportional to speed; in this case there would be:

Resisting force×Speed=Power=Constant=Ec/Tcycle from which:

$$\text{Resisting force} = \frac{Ec}{\text{Speed} \times Tcycle}$$

b) applying a constant force, such as:

Resisting force×cylinder stroke work=Ec from which:

$$\text{Resisting force} = \frac{Ec}{\text{Cylinder stroke}}$$

c) applying a directly proportional force to the slide speed, such as:

Resisting force=K×Speed wherein K is:

$$\int_0^{Tcycle} \text{Resisting force} \times \text{Speed}\, dt = Ec \Leftrightarrow \int_0^{Tcycle} K \times \text{Speed}^2\, dt = Ec$$

It has been found that the aim of maximizing yield can be practically reached only with approach c).

Actually, the linear electric generator may have as a model an ideal variable-voltage generator in series with a resistance Ri, which is the inner resistance of the generator. A variable resistive load R1 is then applied to this generator.

To maximize the drawn-out energy, ratio R1/R2 is required to be maintained constant during the cycle. Thus the power supply works at a constant load and is utilized at most. Since yield depends on ratio R1/R2 and in particular is proportional thereto, in order to maximize yield over a complete cycle (with drawing out of a predetermined amount of energy) this ratio must be maintained as much as possible constant and therefore a current (proportional to the resisting force) must be absorbed which is proportional to the speed (which in turn is proportional to the voltage present at the generator terminals).

Energy in a cycle may be expressed as:

$$Ec = \int_0^{Tcycle} v \times i\, dt$$

wherein v and i are voltage and current at the ideal-generator terminals.

From the above, based on that which has been previously said, it is possible to obtain:

$$c = \frac{\int_0^{Tcycle} v2(t)\, dt}{Ec}$$

Coefficient c has the dimensions of a resistance and supplies the desired constant of proportionality between current to be absorbed and voltage on the ideal generator, and also (unless non-significative constants) between current and slide speed.

In other words, the optimal solution is a function having the same spectrum as v(t) and is merely reduced by an appropriate value c. This brings about the same relation in the domain of time.

In conclusion, in order to have the two conditions met, that is null speed at the movement inversion point and maximum yield of the generator, current is to be absorbed from the generator to such an extent that a proportionality will exist between speed and resisting force. This is achieved by imposing a c, as above calculated, which is substantially constant at at least one central portion of the slide stroke.

At the extremity or limit regions of the stroke, that is close to the stroke reversal points, a motion law which is different from that considered as optimal from the electromechanical point of view may on the contrary be convenient. Actually, in these limit regions it may be advantageous to take into account the fact that pistons are in an advanced compression stroke and therefore the motion law may be varied to optimize thermodynamic operation of the engine. This is possible by virtue of the freedom degree offered to the system due to the lack of a (real or simulated) flywheel, contrary to what happens in known internal combustion engines, in which the flywheel binds motion to a sinusoidal law and enables the only modification of the compression ratio and not of the compression law.

The control device 19 puts into practice the innovatory control method in accordance with the invention. Substantially, drawing of current by the control device is of such a degree that the mentioned proportionality between resisting force and speed or, in an equivalent manner, between current and speed is pursued. In order to enable the set to supply the socket 24 with a constant power or, in any case, a power meeting the requirements of the actual load which is applied to this socket, the control device 19 is comprised of elements 25 for storage and/or dispersion of electric power, so that current absorbed by a real load applied to the socket 24, plus current sent to or drawn out of the storage or dispersion elements, is equal to the current that is required to be drawn out at the generator output 17 in order to be able to carry out the present control method. Obviously, in order to maximize yields, use of storage means alone (selected from chemical accumulators, capacitors, etc., depending on the required transfer speed features) and not of dispersion means too, such as electric resistors for example, should be preferable.

From the point of view of control, the system is defined by some variables that are desired to be controlled, such as slide speed and position, and a controlled variable the variation of which enables values of other variables to be affected.

As above described, for obtaining an optimal current absorption, that is the one enabling maximum yield of the generator, it is merely possible to impose that the control device should absorb from the generator a current instantaneously proportional to the slide speed. It is therefore sufficient to ensure respect of a control law of the type I=K×Speed, wherein K is an appropriate constant ensuring a correct energy absorption, K differing from the previously defined c only as regards constants taking into account the physical implementation of the mathematical model and the fact that, as the independent variable, it uses speed instead of the produced voltage (proportional thereto). Likewise, the last-mentioned K differs from K indicated at point c) due to the proportionality constant between the absorbed current and resisting force.

To apply the control law I=K×Speed, the control device 19 comprises a block 27 converting the position signal which is variable in time and is produced by sensor 16 into a speed signal 28, and a subsequent block 29 multiplying this value by K, so as to obtain signal 30 representing the reference current value Iref to which the absorbed current at the generator output 17 must be forced to tend. The control device 19 has a feedback and adjustment unit 31 receiving signal 30 and absorbing the consequent current I from output 17, to this end controlling exchanges between the generator output 17, the dissipation and storage means 25 and outlet 24.

In actual operation, imposing K as the precalculated constant however produces some problems. As a matter of fact, in the field the thermal engine may have a different behaviour than the theoretical model. Actually combustion is affected by many factors, among which the operating temperature, carburetion, power required from the motor, etc. Therefore energy produced by combustion may differ from the expected value and this affects the true value that constant K should have.

In order to ensure sturdiness of the control system in operation, that is capability of ensuring normal operation of the thermal engine in the presence of trouble, the control device also comprises a further block 26 containing a precalculated curve of a speed profile against the slide position. Block 26 puts into practice correlation means between actual position and expected speed of the slide. Therefore the block receives the position information from sensor 16 and emits the reference speed value 32 corresponding to the speed that the slide should have in the detected position, depending on the table contained in block 26. The speed profile in block 26 has been defined a priori, in a simulation process for example, and is the ideal profile enabling optimal operation, keeping into account the thermodynamic profile generated by the thermal motor and the optimal-absorption law. Therefore, there is a mixed control system considering both optimal current absorption and speed table calculated a priori.

The overall system enables an optimal behaviour of the system to be obtained under rated conditions and a quasi-optimal behaviour if the utilized model does not faithfully reflect the real system or the latter is obliged to work under different conditions than the rated ones.

For maintaining a regular operation of the thermal engine, the control device may also employ the pressure information supplied by sensor 22, 23 to cause detonation of the combustible mixture on reaching of a predetermined compression value.

Figure 2:
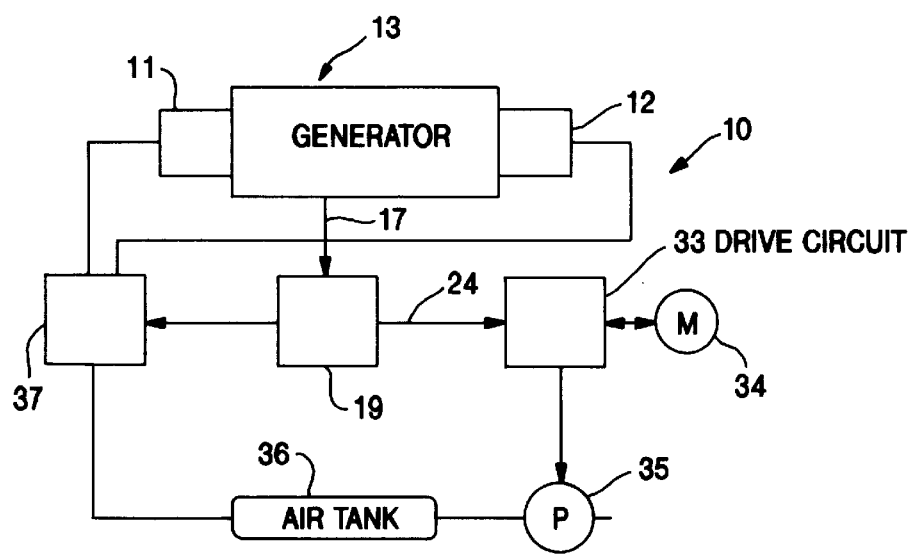
FIG. 2 is a diagrammatic view of the generator set shown in FIG. 1 with a variant useful in case of feeding motors for electric traction.

Shown in FIG. 2 is a variant of the above described generator, which is advantageous for use in systems enabling recovery of mechanical energy. In particular, the solution can be advantageously applied to electric traction systems for wheeled vehicles, such as electric cars and the like.

The output voltage of the control device 19 is applied, by a drive circuit 33, to one or more electric traction motors 34.

The drive circuit 33 is of a substantially known type, and can be easily conceived by a person skilled in the art; it serves to enable adjustment of the rotation speed of the motors, for example. In addition, in case of a braking command, the drive circuit absorbs electric current from the motors, so as to use them as braking elements. The recovered electric power is sent to a compressor 35 supplying a tank 36 with compressed air. This enables the braking energy to be stored even in case of short brakings, that would be too much limited to enable an efficient energy recovery by means of electric accumulators.

The compressed air in tank 36 is employed by a known supercharging circuit 37 to supercharge the internal combustion engine according to a substantially known technique. The control device 19 may also manage supercharging to keep the engine within optimal operating conditions.

At this point it is apparent that the intended purposes have been achieved, by supplying a high-yield generator set of low mechanical complexity. An electric traction unit has been also supplied which comprises this generator set.

Obviously, the above description of an embodiment applying the innovatory principles of the present invention is reproduced by way of example only and must not be considered as a limitation of the scope of the invention as herein claimed.

For example, the mechanical structure of the generator may be different from that diagrammatically shown. The internal combustion engine may operate with the use of different types of fuel and therefore will have a structure appropriate to them. In particular, it is obvious that the cylinders will each have suction and exhaust valves, spark plugs or others, made for the particular fuel used. These known elements, for the sake of simplicity, have not been shown in the drawings.

Whit is claimed is:

1. A method of controlling the reciprocable movement of the inductor slide of a linear electric generator moved by a pair of internal combustion pistons disposed axially in alignment and in opposition, wherein the improvement comprises controlling the current output of the generator during a reciprocation motion cycle of the generator slide, and applying to the generator slide a resisting force substantially proportional to the movement speed of the generator slide at a central stroke area thereof.

2. A method as claimed in claim 1, wherein said resisting force and said slide speed are substantially proportional, so as to come close to a proportionality constant K such that:

$$\int_0^{Tcycle} K \times \text{Speed}^2 \, dt = Ec$$

wherein Ec energy produced in the cycle.

3. A method as claimed in claim 1, characterized in that close to the extremities of the slide stroke, the applied resisting force is different from that defined in the remaining part of the stroke.

4. A method of controlling the reciprocable movement of the inductor slide of a linear electric generator moved by a pair of internal combustion pistons disposed axially aligned and in opposition, wherein the improvement comprises controlling the current output from the generator during a cycle of reciprocating motion of the generator slide, and maintaining a substantially constant value c at at least one central portion of the generator slide stroke, wherein c is given by:

$$c = \frac{\int_0^{Tcycle} v2(t) \, dt}{Ec}$$

wherein v=generator voltage and Ec=energy produced in the cycle.

5. A method as claimed in claim 4, including close to the stroke limits of said slide, causing the current output of the generator to have a value c' different from said value c in said one portion of the stroke.

6. A linear electric generator set comprising a slide extending between a pair of axially aligned internal combustion pistons for recirpocation thereby, and a control device for receiving a slide speed signal produced during each stroke of the slide, said device including means operative at least at one central area of each slide stroke for controlling a current from the generator substantially directly proportional to said slide speed, and for producing a force that resists the slide motion and that is substantially proportional to said speed.

7. A generator set according to claim 6, characterized in that the control device comprises an output for an electric load to be fed, and means for storing and/or dissipating electric power, the control device exchanging current between the generator, the storage and/or dissipation means and output in order to maintain said proportionality of the current from the generator.

8. A generator set according to claim 6, characterized in that the control device comprises correlation means between the slide position and the expected speed at said position, a position sensor of the slide providing a position signal to said correlation means in order to make side speed come close to the expected speed.

9. A generator set according to claim 6, comprising pressure sensors in the piston chambers, the control device including means responsive to said pressure sensors to effect detonation of a mixture admitted to the chambers when a chamber reaches a predetermined pressure.

10. A traction unit comprising a generator set as claimed in claim 6, which unit feeds at least one electric motor, and characterized in that said unit comprises a drive circuit which on receipt of a braking signal from the motor, controls current from the motor and sends said current to an air pumping compressor in a compressed air-supply container the output of which operates a supercharging circuit for the piston chambers.

* * * * *